April 12, 1927.

R. WEAVER

BOLL WEEVIL CATCHER

Filed Nov. 14, 1923

Ross Weaver
INVENTOR

BY Victor J. Evans
ATTORNEY

April 12, 1927.
R. WEAVER
BOLL WEEVIL CATCHER
Filed Nov. 14, 1923 2 Sheets-Sheet 2
1,624,773
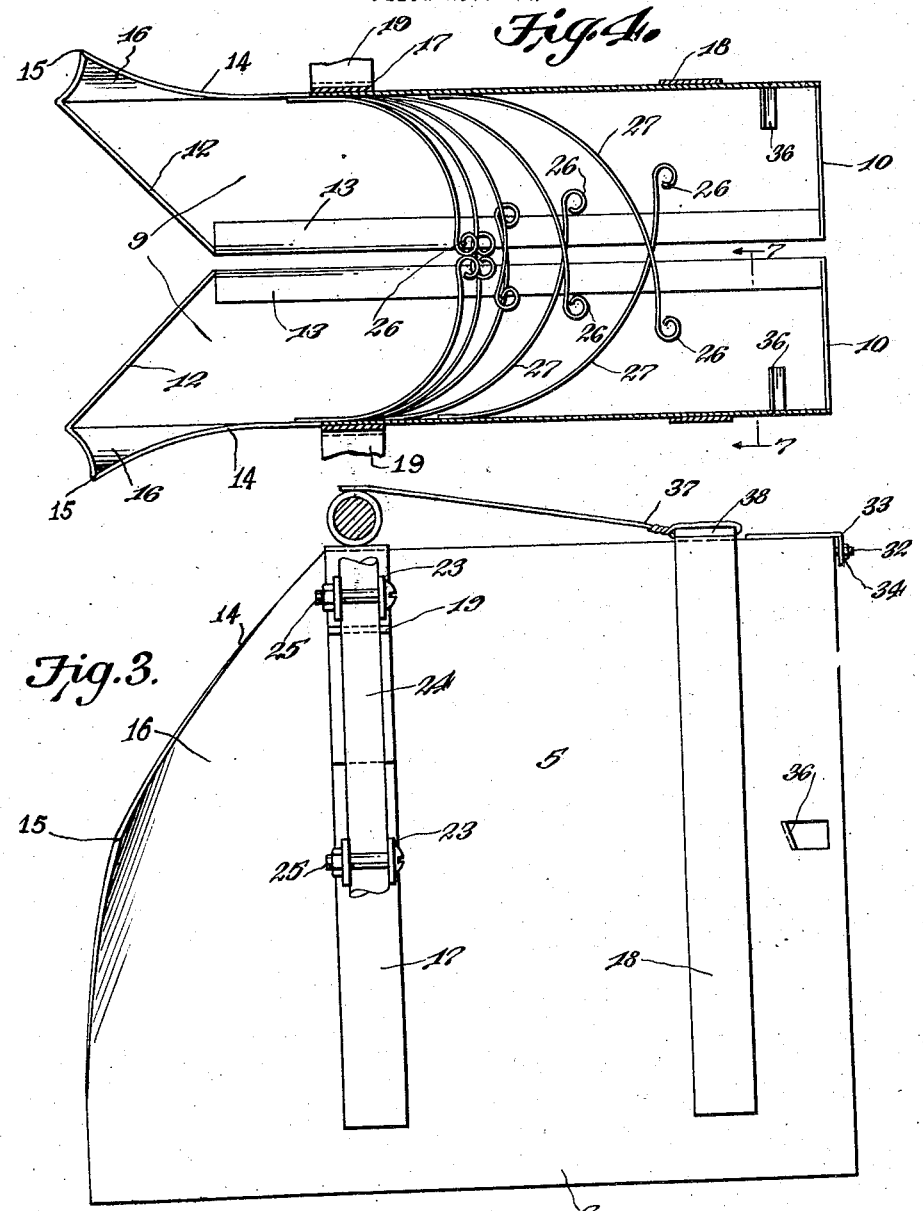
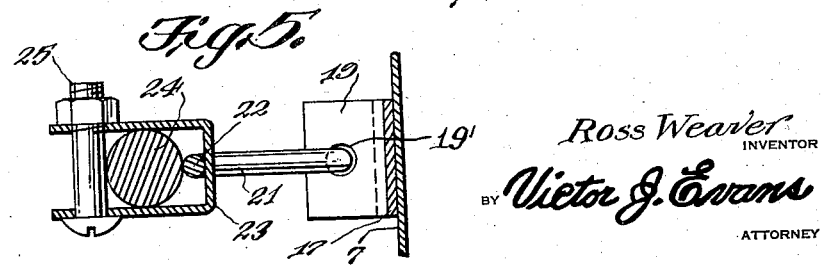
Ross Weaver
INVENTOR
BY Victor J. Evans
ATTORNEY Patented Apr. 12, 1927.

1,624,773

UNITED STATES PATENT OFFICE.

ROSS WEAVER, OF FORREST CITY, ARKANSAS.

BOLL-WEEVIL CATCHER.

Application filed November 14, 1923. Serial No. 674,719.

This invention relates to new and useful improvements in insect exterminators and more particularly to a device for catching and exterminating boll weevils from cotton plants. The main object of the present invention is the provision of a device which can be moved through a field of cotton plants by any well known prime mover and through its engagement with the plants will remove the boll weevil from the plants and cause them to be dropped into an exterminating liquid for the purpose of entirely exterminating the insect.

Another object of the invention is the provision of a boll weevil catcher or exterminator which may be quickly and readily attached to various types of agricultural implements and more particularly to a cultivator of the type using an arched axle whereby the exterminator will be suspended from the axle of the implement so that the same may be readily drawn through the field and brought into contact with the cotton plants for removing the insects therefrom.

With the above and other objects in view the invention consists in the novel features in construction, the combination and arrangement of parts hereinafter more fully set forth, pointed out in the claims and shown in the accompanying drawings in which:

Fig. 3 is a side elevation.

Fig. 4 is a sectional view taken on the line 4—4 of Fig. 2.

Fig. 5 is a detail section taken on the line 5—5 of Fig. 1.

Figure 1:
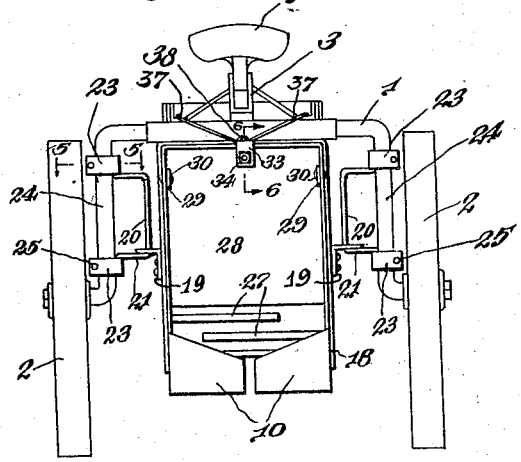
Fig. 1 is a rear elevation of my device illustrating the same attached to the arched frame of a cultivating implement.
Figure 6:
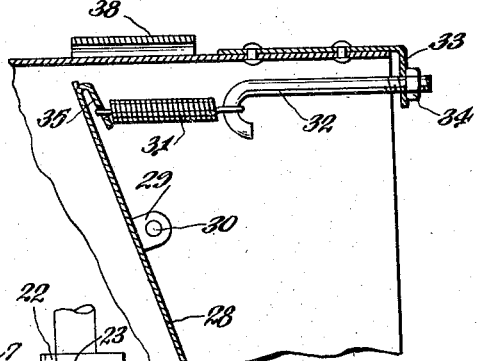
Fig. 6 is a detail section taken on the line 6—6 of Fig. 1.
Figure 2:
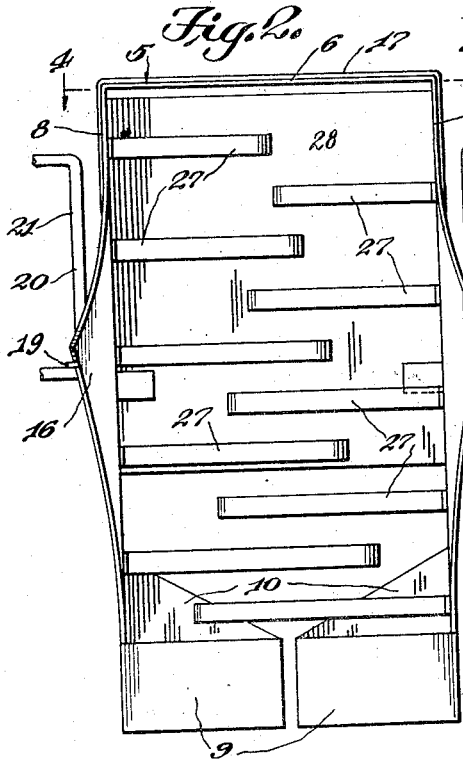
Fig. 2 is a front elevation of the body portion of the device.
Figure 7:
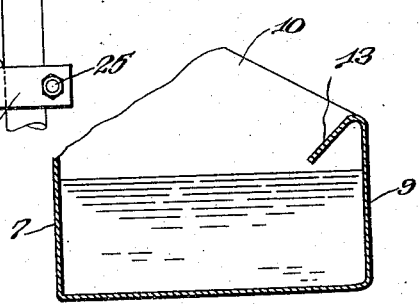
Fig. 7 is a detail section taken on the line 7—7 of Fig. 4.

In the accompanying drawings I have illustrated my improved catcher and exterminator as attached to the arched axle 1 of a cultivator which is supported by the ground wheels 2. Mounted upon the axle 1 is the usual frame 3 which supports the driver's seat 4.

My improvement comprises a hood member 5 which includes the top 6 having the depending side walls 7 and 8 and formed integral at the lower edge of the side walls 7 and 8 are the liquid containing troughs 9, the rear ends of the troughs being provided with the closures 10 which may be disposed flush with the rear edges of the side walls 7 and 8, and the forward ends of the troughs extend inwardly on an incline as at 12 to form a substantially V shaped entrance for the plants as the device is moved through the field. In order to prevent the liquid contained in the troughs 9 from accidentally slopping over the edges, the upper edge of the trough is turned inwardly and disposed upon an inclined angle to form a flange 13 which eliminates unnecessary slopping and loss of the liquid contained within the troughs.

The front edges of the side walls 7 and 8 have their upper corners cut away to form the inclined portions 14 which terminate into corners 15 and the material at the corner portions 15 is bent outwardly to form the guide flanges 16 which are intended to guide the plants into the body of the hood.

The top and side walls of the hood are suitably braced by means of the strap members 17 and 18, the strap member 17 extending across the top 6 at its forward edge and thence down upon each of the side walls 7 and 8 to a point adjacent the lower edge thereof. This bracing strap 17 has attached to each side a bracket plate 19 provided with an opening in its horizontal portion adapted to receive the intermediate portion 20 of the U shaped securing brackets 21. The ends of the brackets 21 are bent outwardly in opposite directions to form the studs 22 which are embraced by the clamping members 23. These clamping members 23 are adapted to be engaged with the up-right side portions 24 of the axle 1 and clamped thereto by means of the bolts 25. From this construction it will be apparent that the supporting brackets 21 are securely connected to the up-right portions 24 of the axle 1 and may be raised or lowered upon the up-right portions in order to support the body of the catcher in a pre-determined position. The supporting bracket 21 which engages with the brackets 19 will support the body of the catcher for swinging movement, it being understood that the opening 19' through the horizontal portion of each of the brackets 19 being substantially larger than the intermediate portion 20 of the brackets 21 so as to permit of the proper amount of swinging movement of the body of the catcher.

In order to remove the boll weevil from the cotton plants as they pass through the hood 5 I have arranged within the body a plurality of obstructions, said obstructions being of a resilient character so as to permit the plants to pass through the hood, but at the same time the yielding movement of the obstructions striking against the plants will tend to remove the boll weevil therefrom as well as the leaves and other parts of the plants which have been impregnated by the weevil. The obstructions in the present instance comprise a resilient piece of metal having one end attached to the side wall of the hood and the other end curved inwardly preferably to a point beyond the center of the hood and the inner end of each of the obstructions being curved rearwardly to form a loop 26 so that as the plants strike the obstructions, the ends of the obstructions will be smooth to permit the plants to pass between the same.

The arms 27 which comprise the obstructions are preferably secured to the side walls of the hood in staggered relation upon opposite sides so that the inner ends of the arms 27 which extend inwardly from the side walls will be arranged in alternate positions, that is the arms which extend inwardly from one side wall being arranged between the arms which extend inwardly from the opposite side wall and in order to provide for a continuous contacting movement of the arms with the cotton plants the arms are attached to the side walls in a retarding position beginning from the top of the hood and retarding in order inwardly of the hood and toward the liquid containing troughs 9. From this construction it will be apparent that as the hood moves over the plants, the uppermost arms of the obstructions will contact with the upper portion of the plants and further movement of the hood over the plants will alternately bring the different arms into contact with the plants, so that a continuous shaking or jarring movement will be imparted to the plants in order to entirely remove the insects and impregnated leaves therefrom. As the insects, etc., are shaken or removed from the plants they drop downwardly into the liquid containing troughs 9 where the insects will be destroyed by the contents of the troughs.

In order to insure the positive removal of all or the majority of the insects from the plants I provide a swinging door member 28 which is pivotally mounted at a point adjacent the rear of the hood, said door having perforated ears 29 formed thereon which are mounted upon the side walls of the hood by means of the pivot pins 30. It will be noted that the door 28 is mounted so that the lower end thereof swings outwardly to permit the plants to pass outwardly from the hood and in order to retain the door in a normal closed position a coil spring 31 is provided one end of which is attached to a hook 32 which is supported by means of the plate 33 carried by the top 6 of the hood. Attention is called to the fact that the hook 32 is adjustable with respect to the plate 33 through turning movement of the nut 34. The opposite end of the spring 31 which is attached to the hook is connected to the perforated flange 35 at the upper edge of the door so that the tension of the spring 31 will tend to retain the door 28 in a normal closed position.

In order to limit the inward swinging movement of the lower end of the door beyond a pre-determined point suitable stops 36 are provided, said stops being formed by cutting out a portion of the metal comprising the side walls of the hood and bending the cut out portion at right angles to the side walls. From this it will be apparent that when the lower end of the door strikes the stops 36 it will prevent the same from swinging further into the hood. By mounting the door for pivotal swinging movement, it will be noted that after a plant has passed the door, the spring 31 will return the door toward its normal closed position and upon the return movement of the door it will strike the plant next in order which is about to pass from the hood and through the engagement of the door with the plant it will have a tendency to remove from the plant any insects or impregnated leaves which might be still remaining thereon.

In order to limit the swinging movement of the hood in a vertical plane in one direction with respect to the axle 1 a tie member 37 is provided, one end of which is attached to the raised portion 38 formed in the intermediate portion of the strap 18 and the other end attached to the frame of the implement upon which the hood is mounted. From this it will be apparent that the swinging movement of the hood in one direction will be limited.

I again wish to call particular attention to the relative positions of the arms 27 which contact with the cotton plants as they pass through the hood, these arms being preferably secured in a rigid position to the inner side walls of the hood and the arms upon one side wall arranged staggered with respect to the arms upon the opposite side walls so that their inner ends will not only extend beyond each other but disposed in alternate staggered relation and furthermore the resilient arms are secured in a position so that they are arranged step by step in a retarded position from the forward end of the hood toward the rear end, and while I use this particular formation of the arms it will be apparent that various other arrangements may be carried out and used as effectively, but I prefer to use the arrangement set forth above.

My improved boll weevil catcher may be supported for use with several types of cultivator and attached to the cultivator so that it can be used in connection with the cultivating of the cotton plants for removing any of the boll weevils from the young plants.

While I have shown and described the preferred form of my invention I wish it to be understood that various changes and alterations may be carried out during the manufacture of the same without departing from the spirit of the invention or the scope of the appended claims.

Having thus described my invention what I claim is:—

1. In an insect exterminator, an arched axle, spaced clamping members secured for adjustment on the side portions of said axle, U-shaped securing brackets received by the clamping members, a hood, bracket plates connected to the sides of said hood and having loose connection with the securing brackets to allow a swinging movement of said hood, plant engaging arms having one of their ends secured to the inner side walls of said hood and being adapted to remove insects from plants, and liquid containing troughs formed with said hood for receiving the insects removed from the plants by the arms.

2. An insect exterminator of the character described comprising an arched axle, wheels therefor, a hood mounted between the side portions, of said axle, bracket plates secured to the outer side walls of said hood, U-shaped securing brackets loosely received by said bracket plates whereby the hood is mounted for swinging movement thereon, clamping members receiving said U-shaped securing brackets and clamping the latter to the side portions of said axle for adjustment thereon, a swinging door in one end of said hood, means carried by the hood for limiting the swinging movement of the door in one direction, a spring forming connection between one end of the door and the hood for normally retaining the door in closed position, plant engaging arms having one of their ends secured in said hood for arranging said arms in staggered relation with respect to each other and cooperating with said door for removing insects from plants, and liquid containing troughs arranged below the arms as and for the purpose specified.

3. In an insect exterminator of the character described comprising an arched axle, a hood disposed between the side portions of said axle, means for securing the hood to said side portions for vertical adjustment thereon and in a manner whereby the hood is capable of movement in a vertical plane, an angle plate secured to the top of the hood with one arm of said plate projecting into alignment with one end of said hood, a swinging door arranged in said hood, means carried by the hood for limiting the swinging movement of the door in one direction, a hook having adjustable connection with the angular plate, a coil spring forming a connection between one end of the hook and one end of the door whereby to normally retain the door in closed position, means carried by said hood and adapted to cooperate with said door for removing insects from plants, and liquid containing troughs formed with said hood as and for the purpose specified.

4. An insect exterminator including a movable supporting element having up-right portions, brackets clamped upon said up-right portions, a hood arranged between the brackets, angle plates secured to each side of the hood and having their horizontal portions perforated to loosely receive the up-right portions of the brackets to mount the hood upon the supporting element for swinging movement, yieldable arms secured to the inner side walls of the hood and extending inwardly, means for limiting the swinging movement of the hood in one direction and troughs adapted to contain exterminating liquid and being formed with said hood below the arms.

In testimony whereof I affix my signature.

ROSS WEAVER.